United States Patent [19]

Lee

[11] Patent Number: 5,974,008
[45] Date of Patent: Oct. 26, 1999

[54] APPARATUS FOR CONTROLLING DISK PLAYER OF A COMPUTER SYSTEM

[75] Inventor: Ju-heon Lee, Suwon, Rep. of Korea

[73] Assignee: SamSung Electronics Co., Ltd., Suwon, Rep. of Korea

[21] Appl. No.: 09/152,799

[22] Filed: Sep. 14, 1998

[30] Foreign Application Priority Data

Sep. 12, 1997 [KR] Rep. of Korea ............. 97-47212

[51] Int. Cl.$^6$ ................................. G11B 17/22
[52] U.S. Cl. ............................. 369/33; 369/32
[58] Field of Search ................. 369/33, 32, 34, 369/58, 54, 47, 48

[56] References Cited

U.S. PATENT DOCUMENTS

| | | | |
|---|---|---|---|
| 4,706,233 | 11/1987 | d'Arc | 369/33 |
| 4,841,505 | 6/1989 | Aoyagi | 369/32 |
| 4,872,067 | 10/1989 | Okatani | 386/70 |
| 4,878,129 | 10/1989 | Yasuda et al. | 386/125 |
| 5,122,999 | 6/1992 | Kimura et al. | 369/32 |
| 5,333,309 | 7/1994 | Hibi . | |
| 5,339,444 | 8/1994 | Nakajima . | |
| 5,345,347 | 9/1994 | Hopkins et al. . | |
| 5,365,502 | 11/1994 | Misono . | |
| 5,394,527 | 2/1995 | Fakhruddin et al. . | |
| 5,420,839 | 5/1995 | Tateishi | 369/32 |
| 5,463,601 | 10/1995 | Yanagisawa . | |
| 5,740,304 | 4/1998 | Katuyama et al. . | |
| 5,761,519 | 6/1998 | Wada et al. . | |
| 5,831,946 | 11/1998 | Bie | 369/33 |

*Primary Examiner*—Tan Dinh
*Attorney, Agent, or Firm*—Robert E. Bushnell, Esq.

[57] ABSTRACT

An apparatus for controlling a disk player used for a computer system and a method therefor. The apparatus includes a disk information storing unit for storing disk position information, a disk information reading unit for reading information on the position of the disk in which the playing of the disk is stopped in the disk player, a controller for controlling the disk player such that the information of a disk stop position read from the disk information reading unit is stored in the disk information storing unit when the playing of the disk is stopped in the player, and the information stored in the disk information storing unit is read to begin playing of the disk from the stopped position when playing of the disk is resumed. When a reproduction operation of the disk is stopped, the disk ID number and stop position information is stored, and the playing of the disk is controlled to resume playing of the disk, with reference to the information. Accordingly, even if playing of the disk is stopped, the playing of the disk can be resumed from the position where the playing has been stopped.

14 Claims, 5 Drawing Sheets

| DISK ID #1 | PLAY POSITION #1 |
| DISK ID #2 | PLAY POSITION #2 |
| DISK ID #3 | PLAY POSITION #3 |
| ⋮ | ⋮ |
| DISK ID #n | PLAY POSITION #n |

# 5,974,008

APPARATUS FOR CONTROLLING DISK PLAYER OF A COMPUTER SYSTEM

CLAIM FOR PRIORITY

This application makes reference to, incorporates the same herein, and claims all benefits accruing under 35 U.S.C. §119 from an application for APPARATUS FOR CONTROLLING DISK PLAYER AND METHOD THEREFOR earlier filed in the Korean Industrial Property Office on the Sep. 12, 1997, and there duly assigned Ser. No. 47212/1997, a copy of which application is annexed hereto.

BACKGROUND OF THE INVENTION

1. Technical Field

The present invention relates to an apparatus and method for controlling a disk player used for a computer system, and more particularly, to an apparatus for resuming play of a disk from the position at which the disk was stopped.

2. Related Art

A typical computer system comprises a display unit (e.g., a monitor), a main body containing a central processing unit (CPU) and data storage devices (e.g., disk drive) in a separate enclosure, and input devices such as a keyboard. This architecture is commonly used in "desk-top" personal computer systems, work stations, terminals and the like. The display unit, the keyboard and the main body containing all the essential circuitry of the computer may be integrated in a single, deployable portable housing structure, typically referred to as "lap-top" computers. Keyboard is connected to the main body through a connector cable to control operation of the computer. The disk drive is configured to record/playback a disk such as a digital video disk (DVD), an audio compact disk (CD), and a video compact disk (CD) on which audio data as well as moving picture data compressed in accordance with MPEG (Moving Picture Experts Group) standard is recorded. Many computer systems have a suspend/resume function which permits the entire operational status of the system to be saved when the power is turned off, and to be restored when the power is turned back on. However, the suspend/resume function does not extend to disk players. When the playing of an audio or video disk is stopped or turned off, the disk must be replayed from the beginning of the disk. Thus, if the user wishes to play from the position at which the audio or video disk was stopped or interrupted, the position must be found before resumption.

Recent efforts to resume the playback from the position at which the audio or video disk was stopped or interrupted can be found, for example, in U.S. Pat. No. 5,365,502 for Optical Disc Player Having A Resume Function issued to Misono, U.S. Pat. No. 5,394,527 for Method And Apparatus Facilitating Use Of A Hard Disk Drive In A Computer System Having Suspend/Resume Capability issued to Fakhuruddin et al., U.S. Pat. No. 5,463,601 for CD-ROM Disc Reproducing Apparatus With Means For Storing Progression Data Of A Control Means issued to Yanagisawa, and U.S. Pat. No. 5,761,519 for Portable Computer Having A Removable Medium Drive And A Resume Setting Function issued to Wada et al. However, I have observed that none is singularly adapted to accommodate multiple disks with different type of identification data structure.

SUMMARY OF THE INVENTION

Accordingly, it is therefore an object of the present invention to provide an improved disk player controller for resuming play of a specific disk from the disk position where the playing was stopped.

It is another object of the present invention to provide a computer system having a disk player for resuming play of a specific disk from the disk position where the playing was stopped.

It is still another object of the present invention to provide a method for controlling a disk player when the playing of the disk is stopped.

It is yet another object of the present invention to provide a method for controlling a disk player when playing of a disk is resumed.

To accomplish the first object of the present invention, there is provided a disk player controller for controlling a disk player playing a designated disk which comprises a disk information storage unit for storing disk position information of different disks; a disk information reading unit for reading information on the position of the designated disk in which the playing of the designated disk is stopped in the disk player; and a controller for controlling the disk player such that the information of a disk stop position read from the disk information reading unit is stored in the disk information storage unit when the playing of the designated disk is stopped in the player, and the information stored in the disk information storage unit is read to begin playing of the disk from the stopped position when playing of the designated disk is resumed.

To accomplish the second object of the present invention, there is provided a computer system which comprises a disk player for playing a designated disk; a disk information storage unit for storing disk position information of different disks; and a controller for controlling the disk information storage unit such that the information of a disk stop position is detected to be stored in the disk information storage unit when the playing of the designated disk is stopped in the player, and for controlling the disk player such that the information stored in the disk information storage unit is read to begin the playing of the designated disk from the stop position when playing of the same disk is resumed.

To accomplish the third object of the present invention, there is provided a method for controlling a disk player in a system including a disk player for playing a designated disk and a storage unit for storing disk ID number and position information of different disks, which comprises the steps of: determining whether a playing operation of the current disk is stopped in a disk player; detecting current disk ID number and position information when the playing operation is stopped; reading the disk ID number and position information from the storage unit; determining whether the read disk information includes the current disk ID number information; and renewing the position information corresponding to the current disk stored in the storage unit to the detected position information when the read disk information includes the current disk ID number information, and storing the current disk ID number and position information in a new region of the storage unit when the read disk information does not include current disk ID number information.

To accomplish the fourth object of the present invention, there is provided a method for controlling a disk player in a system including a disk player for playing a disk, and a storage unit for storing disk ID number and position information, which comprises the steps of: a) inserting a disk into the disk player and playing the inserted disk; b) reading the disk ID number and position information from the storage unit; c) determining whether the read information includes the current disk ID number information; and d) beginning the playing of the disk from a position determined by the position information read from stored in the storage unit when the read information includes the current disk ID number information.

The present invention is more specifically described in the following paragraphs by reference to the drawings attached only by way of example.

BRIEF DESCRIPTION OF THE DRAWINGS

A more complete appreciation of this invention, and many of the attendant advantages thereof, will be readily apparent as the same becomes better understood by reference to the following detail description when considered in conjunction with the accompanying drawings, in which like reference symbols indicate the same or similar elements components, wherein.

DETAILED DESCRIPTION OF THE PREFERRED EMBODIMENT

Figure 1:
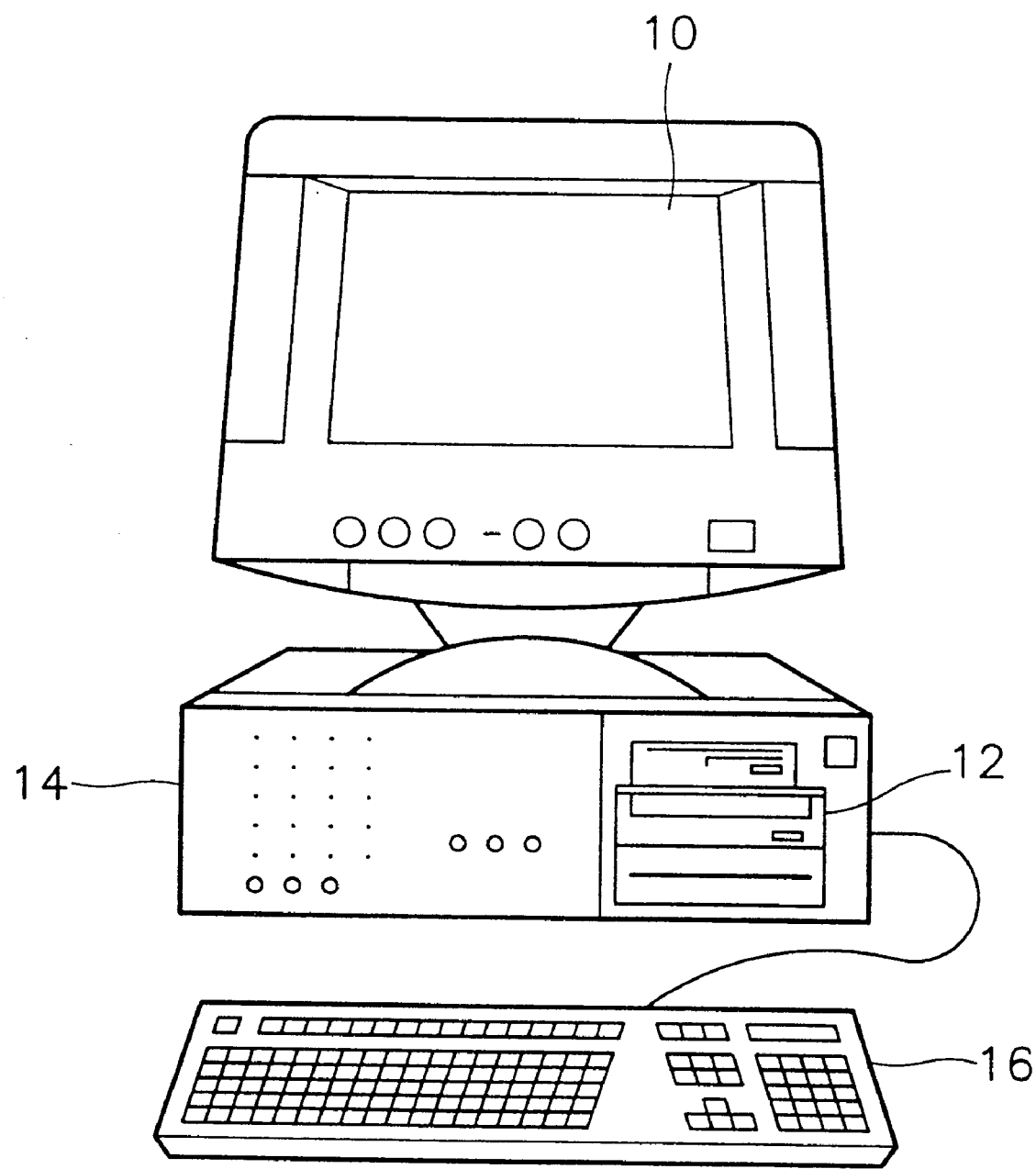
FIG. 1 is a block diagram of a typical computer system.

Referring now to the drawings and particularly to FIG. 1, which illustrates a typical computer system. As shown in FIG. 1, the computer system is composed of a monitor 10, a keyboard 16, and a main case 14 including a main board and a power supply. In addition, a disk drive 12 capable of playing a disk such as a digital video disk (DVD), an audio compact disk, or a video CD may be included. However, if the playing of an audio or video disk is stopped or interrupted, the disk must be replayed from the beginning. Thus, if the user wishes to play from the position at which the audio or video disk was stopped, the position must be found first before resumption.

Figures 2, 3:
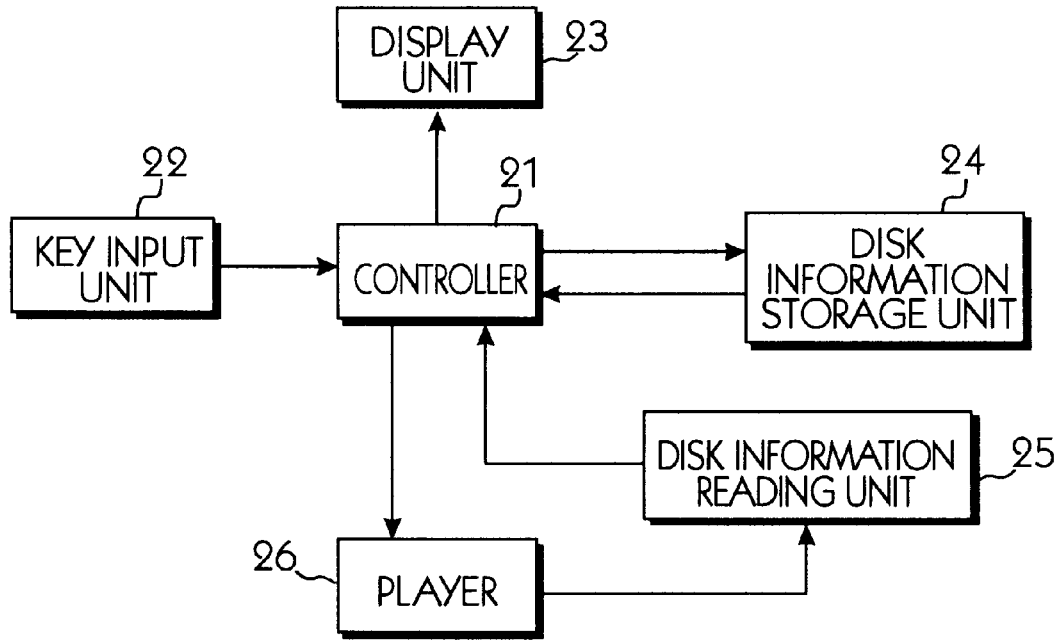
FIG. 2 is a block diagram of an apparatus for controlling a disk player of a computer system according to the principles of the present invention.
FIG. 3 is a diagram of the data structure of the disk information storage unit of FIG. 2.

Turning now to FIG. 2, which illustrates an apparatus for controlling a disk player 26 according to the principles of the present invention. The apparatus includes a key input unit 22 such as a keyboard, a display unit 23 such as a monitor for displaying the result performed by the computer system, a disk information storage unit 24 for storing information of disk identity (ID) numbers and disk positions of different disks for use in the computer system, a disk information reading unit 25 for reading the ID number and position information of a designated disk when the playing of the disk is stopped in the disk player 26, and a controller 21 for storing the information of the disk ID number and disk stop position detected from the disk information reading unit 25 in the disk information storage 24 when the playing of the disk is stopped in the disk player 26, and for reading the information stored in the disk information storage 24 when the playing of the disk is resumed and controlling the disk player 26 to play the disk from the stopped position.

In addition, when the playing of a designated disk is stopped in the disk player 26 and information of a current disk is stored in the disk information storage 24, the controller 21 renews the play position data corresponding to the disk ID information, and when the playing of the disk is stopped in the disk player 26 and information of a current disk is not stored in the disk information storage unit 24, the current disk ID number and play position information is stored in a new region of the disk information storage unit 24. Also, when the playing of the disk is stopped in the disk player 26 and the current position of the disk is located at the end of the disk, the information of the disk is deleted from the disk information storage 24. Meanwhile, when the disk plays in the player 26 and the information of the current disk is not stored in the disk information storage 24, the disk plays from the beginning.

FIG. 3 shows the data structure of the disk information storage unit 24 of FIG. 2. The storage unit 24 includes regions for respectively storing ID number information and disk position information of different disks where the playing is stopped, and at least 10–20 pairs of data.

Figure 4:
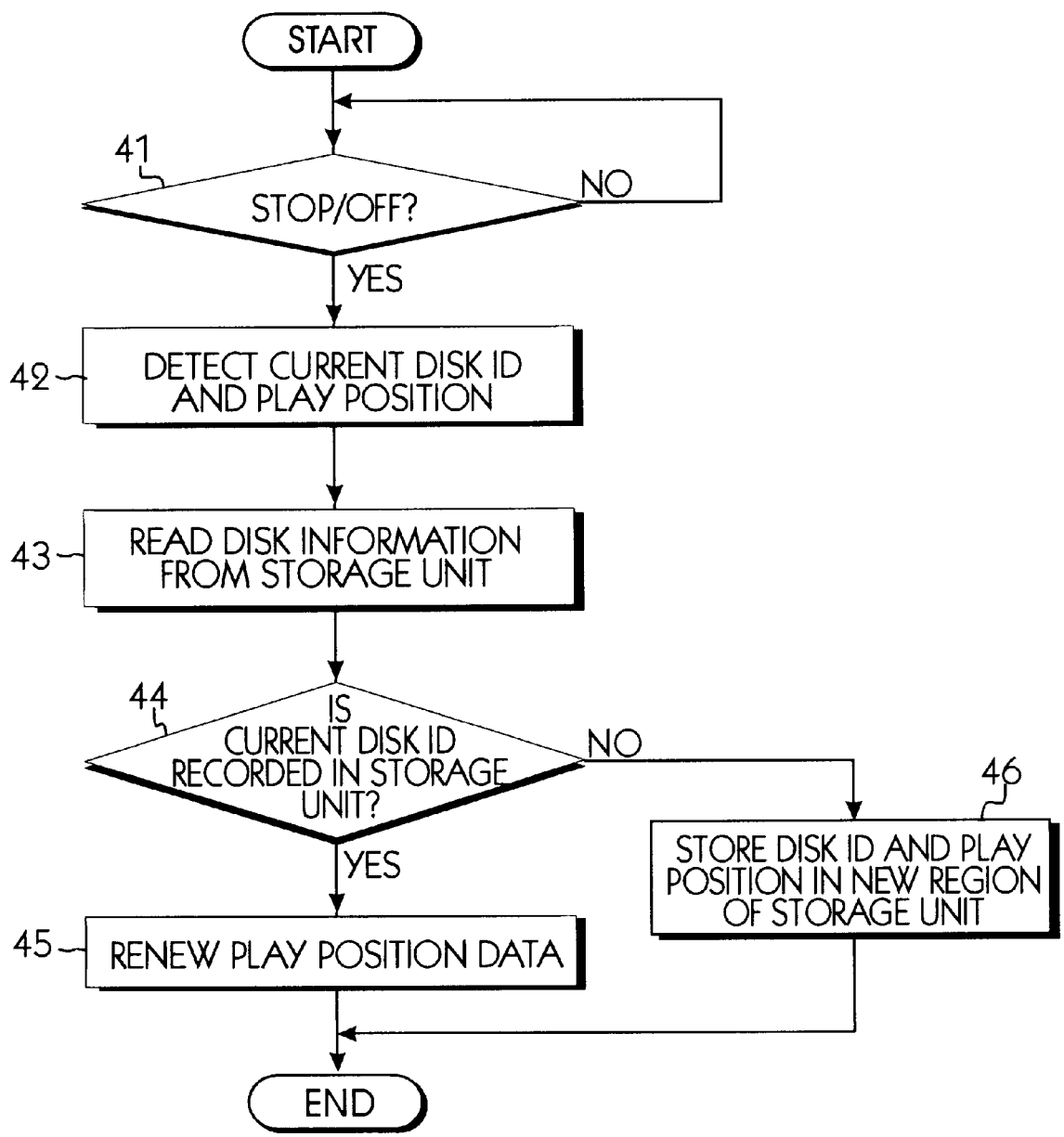
FIG. 4 is a flowchart of a method for controlling a disk player when reproduction of a disk is stopped, according to a preferred embodiment of the present invention.

FIG. 4 is a flowchart of a method for controlling a disk player when the playing of a designated disk is stopped, according to a first embodiment of the present invention. First, the controller 21 determines whether a reproduction operation of a disk currently playing in the player 26 is stopped by a stop key or from power being turned off at step 41. When the reproduction operation is stopped, information of the current disk ID number and the stopped position of the current disk is detected at step 42, and the information of the disk ID number and position stored in the storage unit 24 is read at step 43. Next, the controller 21 determines whether the information read from the storage unit 24 includes the information of the current disk ID number, i.e., whether the information of the current disk is recorded in the storage unit at step 44.

If the information of the current disk is recorded in the storage unit 24, the play position information recorded in the storage unit 24 is renewed to the currently detected position information at step 45. If the information of the current disk is not recorded in the storage unit 24, the information of the current disk ID number and position is stored in the new region of the storage unit at step 46.

Figure 5:
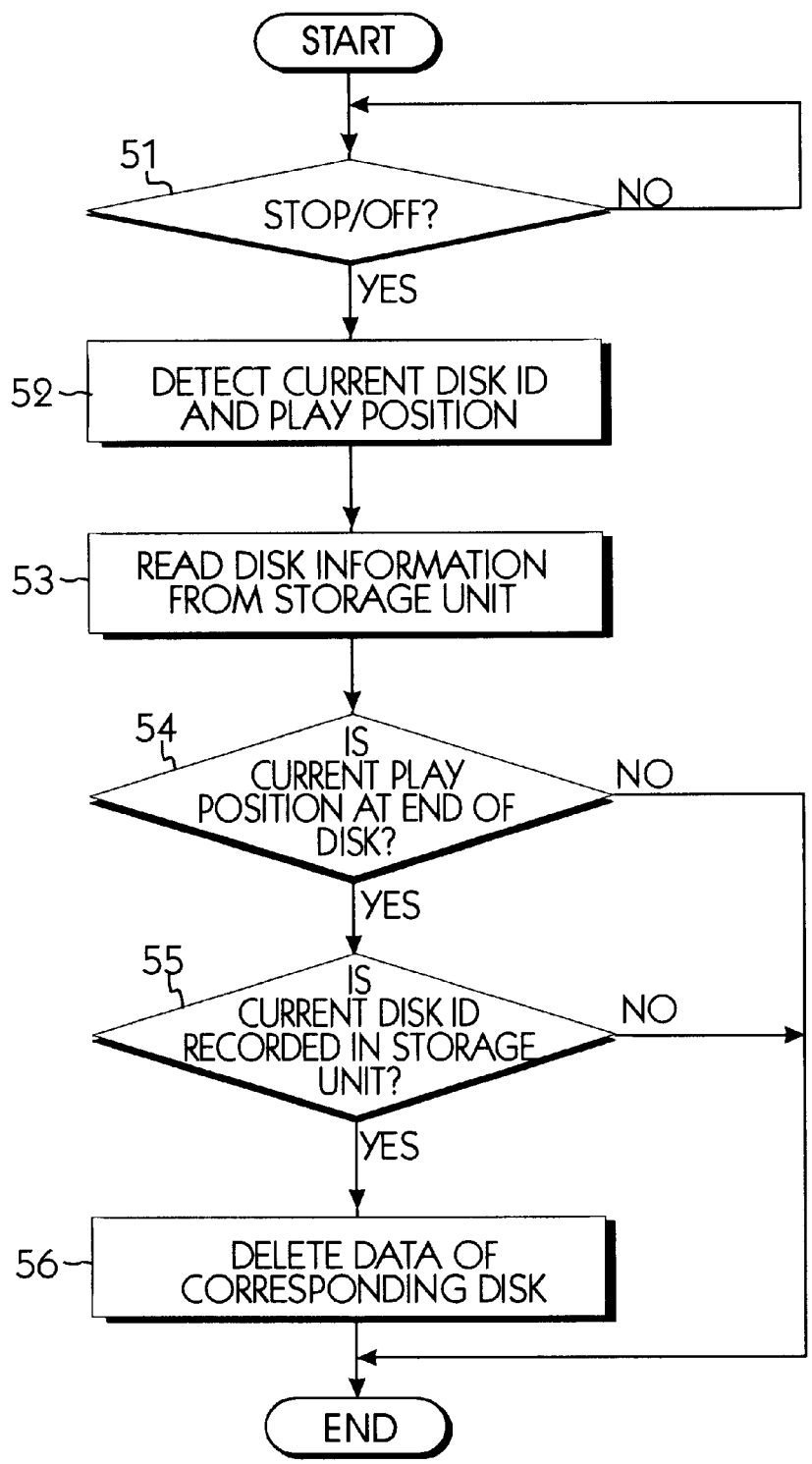
FIG. 5 is a flowchart of a method for controlling a disk player when reproduction of a disk is stopped, according to another preferred embodiment of the present invention.
Figure 6:
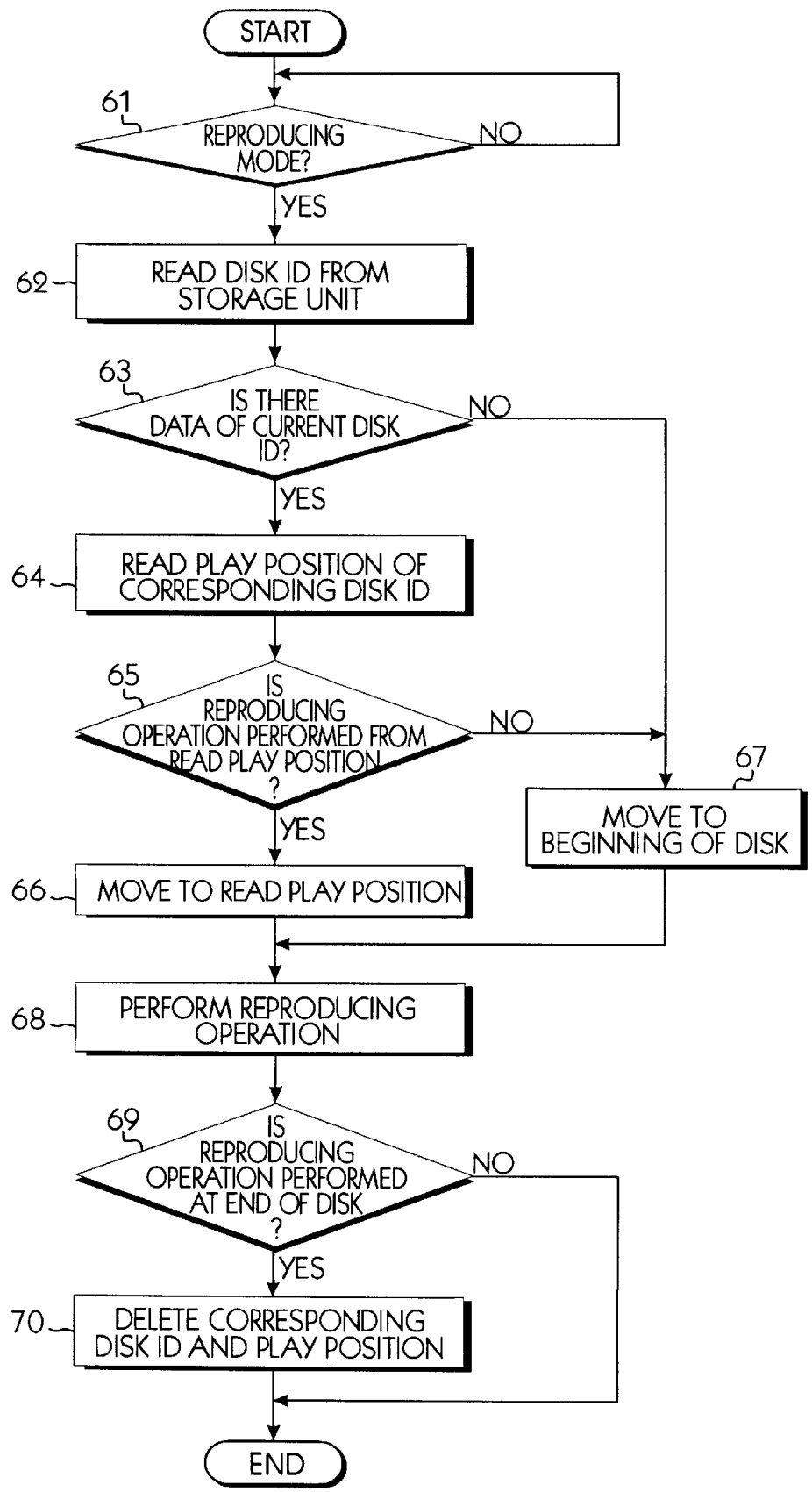
FIG. 6 is a flowchart of a method for controlling a disk player when a disk plays, according to yet another preferred embodiment of the present invention.

FIG. 5 is a flowchart of a method for controlling a disk player when reproduction of a disk is stopped, according to a second embodiment of the present invention. As described with reference to FIG. 4, the controller 21 first determines whether a reproduction operation of the disk currently playing in the player is stopped at step 51. When the reproduction operation of the current disk is stopped, the current disk ID number information and the position is detected at step 52, and the disk ID number information and the position stored in the storage unit 24 is read at step 53. Next, the controller 21 determines whether the player has stopped after the current play position is at the end of disk, that is, playing is performed to the end of the disk at step 54. If the player stops after the playing is performed to the end of the disk, and the information of the current disk is stored in the storage unit 24 at step 55, the disk information recorded in the storage unit 24 is deleted at step 56. FIG. 6 is a flowchart for illustrating a method for controlling a disk player when the disk is reproduced, according to a third embodiment of the present invention, i.e., a method of reproducing the disk through the player 26 in a computer system including the player 26 for playing the disk, and a storage unit 24 for storing information of disk ID number and position.

The controller 21 determines whether the player 26 is in a reproduction mode for playing a designated disk at step 61.

When the player 26 is in the reproduction mode, the disk ID number information stored in the storage unit 25 is read at step 62. The controller 21 then determines whether the read disk information includes ID number information of the current disk at step 63. If the read information includes current disk information, the play position information of a corresponding disk is read from the storage unit at step 64. After the play position information of the corresponding disk is read from the storage unit, the controller 21 checks whether a disk play begins at the position determined by the position information read from the storage unit at step 65, and then the player 26 begins disk reproduction from the position of the disk determined by the read position information at steps 66 and 68.

If the read information includes no current disk information, or reproduction from a position according to the read information is not desired, the player 26 moves the reproduction position to the beginning of the disk play at step 67 so as to begin reproduction of the disk at step 68. If the player stops after reproduction is performed to the end of the disk, and the information of the disk is recorded in the storage unit 24 at step 69, the information recorded in the storage unit 24 is deleted at step 70.

According to the apparatus for controlling a disk player and the method therefor, when a reproduction operation of the disk is stopped, the information of the disk ID number and stop position is stored, and the playing of the disk is controlled to resume play of the disk, with reference to the information. Accordingly, even if the playing of the disk is stopped in the middle of the reproduction, the disk play can be resumed from the position where the playing was stopped.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A disk play controller for controlling a disk player playing a designated disk, comprising:
    a disk information storing unit for storing disk position information of different types of disks;
    a disk information reading unit for reading information on the position of a designated disk from said different types of disks in which the playing of said designated disk is stopped in the disk player; and
    a controller for controlling the disk player such that the information of a disk stop position of said designated disk read from the disk information reading unit is stored in the disk information storing unit when the playing of said designated disk is stopped in the player, and the information stored in the disk information storing unit is read to begin playing of said designated disk from the stopped position when the playing of said designated disk is resumed.

2. The disk player controller of claim 1, further comprised of said disk information storing unit storing disk identification number information together with the disk position information.

3. The disk player controller of claim 1, wherein, when the playing of said designated disk is stopped in the disk player and the disk information storing unit includes current disk information, said controller renews stop position data of said designated disk, and when the playing of said designated disk is stopped in the disk player and the disk information storing unit includes no information of a current disk, the current disk identification number and stop position information is stored in a new region of the disk information storing unit.

4. The disk player controller of claim 1, wherein, when the playing of said designated disk is stopped in the disk player and the position of the current disk is located at the end of said designated disk, said controller deletes the disk information recorded in the disk information storing unit.

5. The disk player controller of claim 1, wherein said controller begins the playing of said designated disk from the beginning of the disk while said designated disk is being played in the disk player, if the information of the current disk is not stored in the disk information storing unit.

6. A computer system, comprising:
    a disk player for playing a designated disk from different types of disks;
    a disk information storing unit for storing disk position information of said different types of disks; and
    a controller for controlling the disk information storing unit such that the information of a disk stop position of said designated disk is detected to be stored in the disk information storing unit when the playing of said designated disk is stopped in the disk player, and for controlling the disk player such that the information stored in the disk information storing unit is read to begin the playing of said designated disk from the stop position when playing of said designated disk is resumed.

7. The computer system of claim 6, further comprised of said disk information storing unit storing disk identification number information together with the disk position information.

8. In a system including a disk player for playing a designated disk from different types of disks and a storage unit for storing disk identification number and position information of different types of disks, a method for controlling the disk player comprising the steps of:
    determining whether a playing operation of a current disk is stopped in a disk player;
    detecting a current disk identification number and position information when the playing operation of the current disk is stopped;
    reading the disk identification number and position information from the storage unit;
    determining whether the read disk information includes the current disk identification number and position information; and
    renewing the position information corresponding to the current disk stored in the storage unit to the detected position information when the read disk information includes the current disk identification and position information, and storing the current disk identification number and position information in a new region of the storage when the read disk information includes no current disk identification and position information.

9. The method of claim 8, further comprising the steps of: inserting the designated disk, which was once played by the disk player, into the disk player and playing the inserted disk;

reading position information of the inserted disk from the storage unit; and beginning the playing of the inserted disk from a position determined by the read position information.

10. The method of claim 8, further comprising the step of deleting the disk information corresponding to the designated disk recorded in the storage unit when a disk playing operation is stopped and the current play position of the designated disk is at the end of the designated disk.

11. In a system including a disk player for playing a designated disk from different types of disks, and a storage unit for storing disk identification number and position information of different types of disks, a method for controlling the disk player comprising the steps of:

a) inserting a designated disk into the disk player and playing the inserted disk;

b) reading the disk identification number and position information from the storage unit;

c) determining whether the read information includes a current disk identification number information of the inserted disk; and d) beginning the playing of the inserted disk from a position determined by the position information read from the storage unit, when there is current disk information corresponding to the current disk.

12. The method of claim 11, further comprised of said disk player playing said designated disk from the beginning when there is no disk information corresponding to the current disk.

13. The method of claim 11, further comprised of determining whether the playing of said designated disk begins from a position determined by the play position information read from the storage unit when the disk information corresponding to the current disk exists at step d).

14. The method of claim 11, further comprised of deleting the disk information corresponding to the current disk from the storage unit when the playing of said designated disk is finished to the end point.

* * * * *